United States Patent
Mayer et al.

(10) Patent No.: US 7,429,027 B2
(45) Date of Patent: Sep. 30, 2008

(54) SELF-FLUSHING NEEDLE VALVE

(75) Inventors: Daniel W. Mayer, Wyoming, MN (US); Stephen D. Tuomela, Ramsey, MN (US)

(73) Assignee: Mocon, Inc., Minneapolis, MN (US)

( * ) Notice: Subject to any disclaimer, the term of this patent is extended or adjusted under 35 U.S.C. 154(b) by 0 days.

(21) Appl. No.: 11/349,824

(22) Filed: Feb. 8, 2006

(65) Prior Publication Data

US 2007/0181837 A1 Aug. 9, 2007

(51) Int. Cl.
*F16K 47/00* (2006.01)
*F16L 55/02* (2006.01)

(52) U.S. Cl. .................. 251/122; 251/282; 137/874; 73/40

(58) Field of Classification Search .................. 251/281, 251/282, 122; 137/872, 874; 73/40, 47
See application file for complete search history.

(56) References Cited

U.S. PATENT DOCUMENTS

| | | | | |
|---|---|---|---|---|
| 3,318,577 A | * | 5/1967 | Banks | 251/332 |
| 3,976,279 A | * | 8/1976 | Walker | 251/267 |
| 4,341,370 A | * | 7/1982 | Banks | 251/282 |
| 5,014,716 A | * | 5/1991 | Ogawa | 600/498 |
| 5,386,965 A | * | 2/1995 | Marchal | 251/282 |
| 2004/0099832 A1 | * | 5/2004 | Gessaman | 251/282 |

OTHER PUBLICATIONS

Brooks Instrument, Design Specifications, DS 8744; Oct. 1998, pp. 1-4.

* cited by examiner

*Primary Examiner*—John K Fristoe, Jr.
(74) *Attorney, Agent, or Firm*—Sherrill Law Offices, PLLC

(57) ABSTRACT

A needle valve with a hollow needle effective for permitting a portion of the fluid passing through the valve to flow throughout the valve and exit through any leaks in the valve, whereby any environmental fluid within the valve is displaced by the fluid passing through the valve.

6 Claims, 2 Drawing Sheets

SELF-FLUSHING NEEDLE VALVE

BACKGROUND

Needle valves are often employed to control flow of a fluid. Needle valves are particularly suited for controlling fluid flow to a gas analyzer such as a sensor for measuring $CO_x$, $HH_3$, $NO_x$, $O_2$, $SO_x$, etc. While generally effective for controlling fluid flow to gas analyzers, the test fluid can often be contaminated by environmental fluids introduced into the test fluid through the needle valve.

Efforts to seal needle valves against the introduction of environmental air into a fluid flowing through the valve have resulted in significant improvement, but have practical limitations, size considerations and/or cost considerations which render even the most carefully constructed needle valve insufficient or impractical for certain applications requiring detection of contaminants at concentrations at less than parts per million (ppm).

Accordingly, a need exists for a needle valve capable of preventing the introduction of even minute amounts of environmental air into a fluid flowing through the valve.

SUMMARY OF THE INVENTION

The invention is a needle valve with a hollow needle. The lumen through the needle is effective for permitting a minor portion of the fluid passing through the valve to flow throughout the valve and exit through any leaks in the valve, whereby any environmental fluid within the valve is displaced by the fluid passing through the valve.

The needle valve includes a valve body defining a chamber. The chamber is sealingly divided into a first portion and a second portion with a first orifice and a second orifice in fluid communication with the first portion of the chamber. The needle is longitudinally repositionable within the first orifice for restricting fluid flow through the first orifice to an extent dependant upon the longitudinal position of the needle within the first orifice. The lumen through the needle permits fraction of the fluid flowing through the first portion of the chamber to flow through the lumen and into the second portion of the chamber.

DETAILED DESCRIPTION OF THE INVENTION INCLUDING A BEST MODE

Nomenclature
10 Valve
20 Valve Body or Bonnet
27 First Orifice Through Valve Body
28 Second Orifice Through Valve Body
29 Chamber
29a First Portion of Chamber
29a Second Portion of Chamber
30 Knob
40 Bonnet Nut
50 Valve Stem Screw
51 Externally Threaded Shaft on Valve Stem Screw
60 Valve Stem Plunger
65 Internally Threaded Bore on Valve Stem Plunger
69 Orifice Through Valve Stem Plunger
70 Needle
79 Lumen Through Needle
79a First End of Lumen Through Needle
79b Second End of Lumen Through Needle
80 Endcap
x Longitudinal Axis Definitions As utilized herein, including the claims, the phrase "minor portion" means less than 50%.

As utilized herein, including the claims, the term "fraction" means less than 10%.

As utilized herein, including the claims, Poiseuille's Law refers to the mathematical equation set forth below which was developed by the French physician Jean Poiseuille to describe the rate of flow of a fluid through a lumen based upon the diameter, length and pressure drop along the lumen.

$$R = [(\pi)(r^4)(\Delta P)]/(8 \mu L)$$

Figure 1:
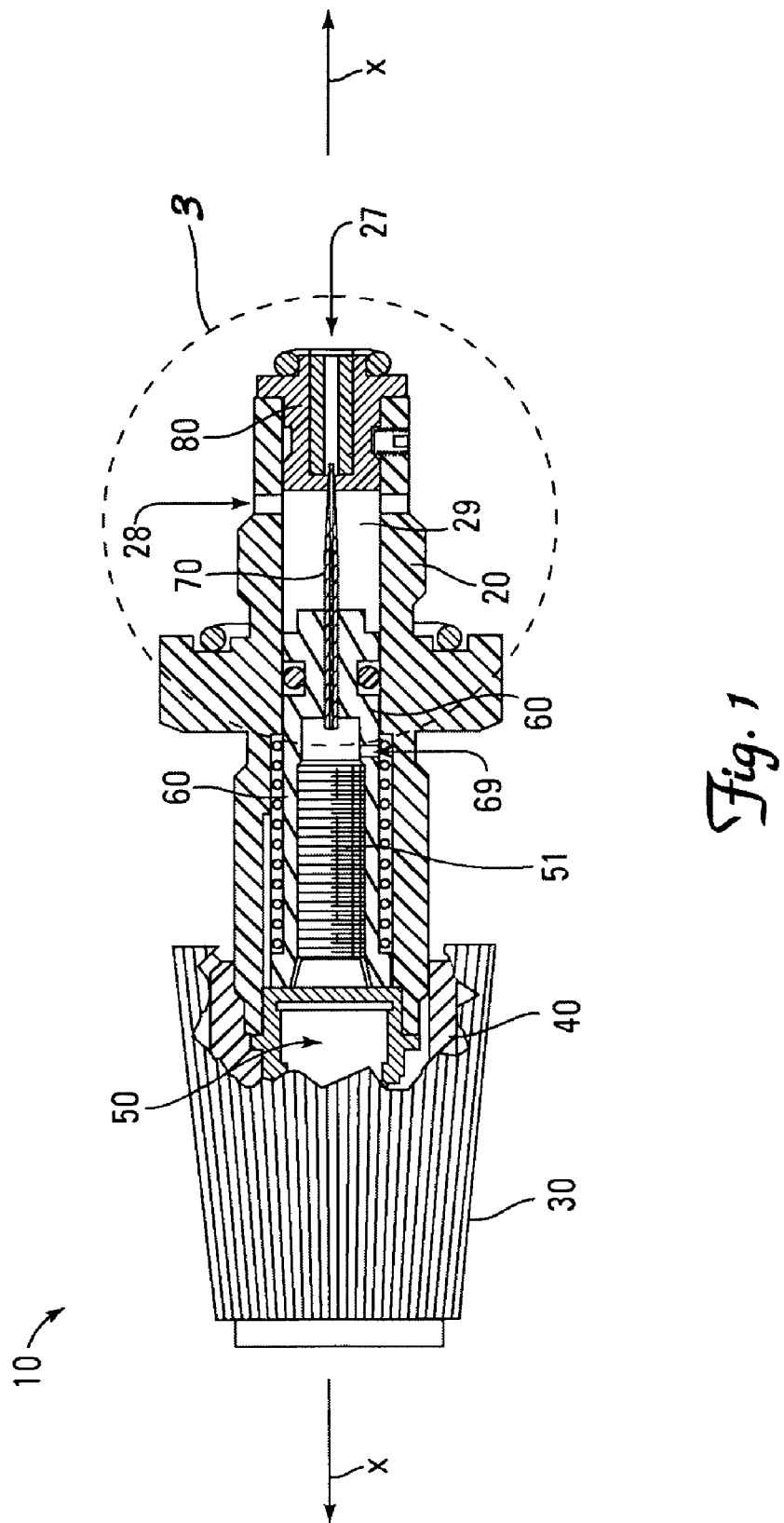
FIG. 1 is a cross-section side view of one embodiment of the invention.

Where:
R=rate of flow
r=inside radius of the lumen
$\Delta P = P_1 - P_2$ wherein
$P_1$=pressure at one end of the lumen
$P_2$=pressure at the other end of the lumen
μ=viscosity of the fluid flowing through the lumen
L=length of the lumen Structure and Use As shown in FIG. 1, the invention is a flow control valve 10 with a hollow needle 70 effective for directing some of the fluid pass through the valve 10 (hereinafter "source fluid") into the valve 10 itself. That portion of the source fluid flowing through the lumen 79 in the needle 70 displaces any environmental fluid present within the valve 10. By flushing any environmental fluid present in the valve 10 with source fluid, environmental fluid is prevented from leaking into the valve 10. This significantly reduces the possibility that source fluid exiting the valve 10 through the first orifice 27 or second orifice 28 will be contaminated with environmental fluid which is of particular concern when the source fluid is to be analyzed downstream from the valve 10 for the presence of a component found in the environmental fluid, such as analyzing a source gas for $O_2$, or $H_2O$ content.

Figure 2:
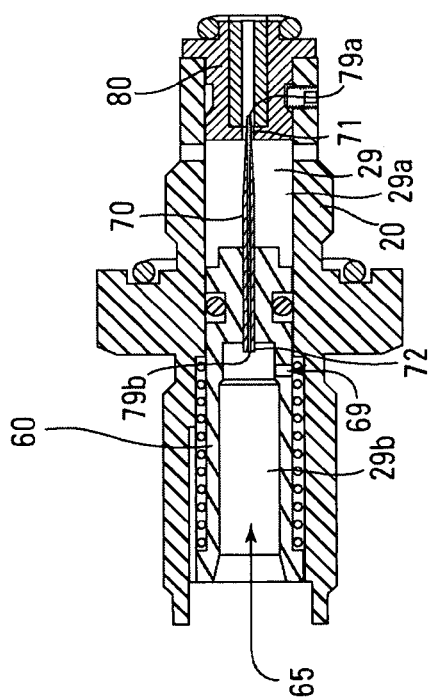
FIG. 2 is cross-sectional side view of the invention shown in FIG. 1 depicting only the bonnet, valve stem plunger, needle and endcap components of the valve.
Figure 3:
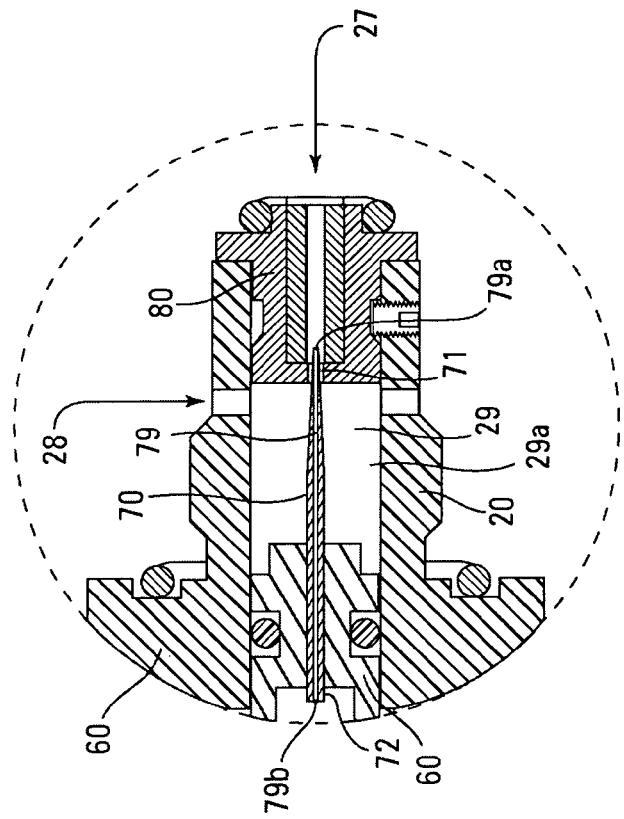
FIG. 3 is an enlarged cross-sectional side view of that portion of the invention encircled in FIG. 2.

The construction and use of needle valves 10 is well known to those skilled in the art. As shown in FIGS. 1 and 2, a needle valve includes a valve body or bonnet 20, a knob 30, a bonnet nut 40. a valve stem screw 50, a valve stem plunger 60, a needle 70 and an endcap 80.

The valve body 20 defines a chamber 29 sealingly divided by the valve stem plunger 60 into a first portion 29a and a second portion 29b. The valve body 20 and the endcap 80 provide a first orifice 27 and a second orifice 28 in fluid communication with the first portion 29a of the chamber 29 for permitting controlled flow of a source fluid through the first portion 29a of the chamber 29.

The knob 30 is rotatably attached to a first end (unnumbered) of the valve body 20 by the bonnet nut 40. The valve stem screw 50 is positioned within the chamber 29 defined by the valve body 20 and attached at a first end (unnumbered) to the knob 30 for coterminous rotation of the valve stem screw 50 with rotation of the knob 30 about a longitudinal axis x.

The valve stem plunger 60 is positioned within the chamber 29 defined by the valve body 20 and includes an O-ring seal (unnumbered) for sealingly engaging the inner wall (unnumbered) of the valve body 20 so as to divide the chamber 29 into the first portion 29a and the second portion 29b. The first end (unnumbered) of the valve stem plunger 60 includes an internally threaded bore 65 threadably engaging an externally threaded shaft 51 on the valve stem screw 50 for translating rotation of the valve stem screw 50—effected by rotation of knob 30—into longitudinal x movement of the valve stem plunger 60 within the chamber 29.

An orifice 69 is provided through the valve stem plunger 60 for placing the internally threaded bore 65 defined by the valve stem plunger 60 into fluid communication with the void volume (not separately numbered) between the valve stem plunger 60 and the valve body 20.

The needle 70 is fixedly attached to the second end (unnumbered) of the valve stem plunger 60 and extends longitudinally x from the valve stem plunger 60 into the first orifice 27, which is preferably the inlet or high pressure orifice, through endcap 80. The needle 70 is tapered so that the size of the opening through the first orifice 27 can be adjusted—and hence the flow of source fluid through the first orifice 27—by longitudinal movement of the needle 70 relative to the first orifice 27. Since the needle 70 is fixedly attached to the second end (unnumbered) of the valve stem plunger 60, the needle 70 can be longitudinally x repositioned by rotation of the knob 30.

A lumen 79 extends through the needle 70 with a first end 79a of the lumen 79 in fluid communication with the first portion 29a of the chamber 29 and a second end 79b of the lumen 79 in fluid communication with the second portion 29b of the chamber 29. Hence, the lumen 79 functions as a conduit through which a quantity of the source fluid flowing into the first portion 29a of the chamber 29 can flow into the second portion 29b of the chamber 29 (i.e., into internally threaded bore 65 defined by the valve stem plunger 60 and then through orifice 69 into the void volume between the valve stem plunger 60 and the valve body 20). Since the source fluid is flowing under a pressure greater than atmospheric pressure, the source fluid flowing into the second portion 29b of the chamber 29 will displace any environmental fluid within the second portion 29b of the chamber 29 and exit the second portion 29b of the chamber 29 through any available leaks, cracks, gaps and fissures in the valve 10.

The diameter (unnumbered) of the lumen 79 through the needle 70 and the diameter of the orifice 69 through the valve stem plunger 60 can each be selected as necessary to provide the desired flow rate of source fluid through the second portion 29b of the chamber 29, with the quantity of source fluid flowing through orifice 69 and lumen 79 governed by Poiseuille's Law. Generally, a flow rate of between about 1 cm$^3$ per minute and 10 cm$^3$ per minute is desired as a flow rate of less than about 1 cm$^3$ per minute may be ineffective for completely displacing environmental fluid within the valve 10 while a flow rate of greater than about 10 cm$^3$ per minute siphons off excessive source fluid with only minimal concomitant advantage in the displacement of environmental fluid from the valve 10.

We claim:

1. A flow control valve comprising:
   (a) a valve body defining a chamber sealingly separated into a flow control portion and a valve control portion,
   (b) a needle valve in communication with both the flow control and valve control portions of the chamber, the needle valve configured and arranged for longitudinal reciprocation within the valve body,
   (c) a biasing spring retained within the valve control portion of the chamber, the biasing spring biasing the needle valve in a first longitudinal direction,
   (d) a plurality of dynamic seals in sealing contact with the needle valve effective for maintaining sealed separation of the flow control portion and the valve control portion, and
   (e) a lumen in the needle effective for permitting a minor portion of a fluid passing through the flow control portion of the chamber to flow through the lumen, past every dynamic seal in sealing contact with the needle valve, and into the valve control portion of the chamber, and thereafter exit the valve body through any leaks in the valve, whereby any environmental fluid within the valve body is displaced by the fluid passing through the flow control portion of the chamber.

2. The flow control valve of claim 1 wherein the needle valve is a tapered needle.

3. A flow control valve, comprising:
   (a) a valve body defining a chamber sealingly divided into a first portion and a second portion with an first orifice and a second orifice in fluid communication with the first portion of the chamber, and
   (b) a needle longitudinally repositionable within the first orifice for restricting fluid flow through the first orifice to an extent dependant upon the longitudinal position of the needle within the first orifice, and
   (c) a biasing spring retained within the second portion of the chamber, the biasing spring biasing the needle in a first longitudinal direction,
   (d) a plurality of dynamic seals in sealing contact with the needle effective for maintaining sealed separation of the first portion and the second portion of the chamber,
   (e) wherein a lumen through the needle permits a fraction of a fluid flowing through the first portion of the chamber to flow through the lumen past every dynamic seal in sealing contact with the needle valve, and into the second portion of the chamber, and thereafter exit the valve body through any leaks in the valve.

4. The flow control valve of claim 3 wherein a valve stem plunger is fixedly attached to the needle at a distal end and threadably engaged by a valve stem screw at a proximal end for effecting longitudinal repositioning of the valve stem plunger and needle upon rotation of the valve stem screw.

5. The flow control valve of claim 4 wherein (i) the valve stem plunger and valve stem screw divide the second portion of the chamber into at least an inner void volume and an outer void volume, (ii) the lumen through the needle is in direct fluid communication with the inner void volume, and (iii) an orifice through the valve stem plunger provides fluid communication between the inner void volume and the outer void volume.

6. The flow control valve of claim 3 wherein the needle is a tapered needle.

* * * * *